United States Patent [19]
Massung

[11] 3,941,030
[45] Mar. 2, 1976

[54] FLUID PRESSURE-GRAVITY MOTOR

[76] Inventor: Patrick Massung, 620 Eden Park Blvd., McKeesport, Pa. 15132

[22] Filed: July 29, 1974

[21] Appl. No.: 492,683

[52] U.S. Cl. .................. 91/4 R; 91/180; 91/491; 92/90; 60/675
[51] Int. Cl.² .. F01L 33/02; F01B 1/06; F01B 13/06
[58] Field of Search ...... 417/329; 91/4 R, 498, 491, 91/180; 60/675; 92/89, 90, 91, 92

[56] References Cited
UNITED STATES PATENTS

| | | | |
|---|---|---|---|
| 196,759 | 11/1877 | Miller | 60/675 |
| 389,515 | 9/1888 | Iske | 60/675 |
| 3,019,772 | 2/1962 | Humphrey | 91/180 |
| 3,357,312 | 12/1967 | Rogov et al. | 91/498 |
| 3,661,057 | 5/1972 | Rogov | 91/498 |

FOREIGN PATENTS OR APPLICATIONS

| | | | |
|---|---|---|---|
| 3,075 | 9/1875 | United Kingdom | 60/675 |
| 472,491 | 5/1914 | France | 60/675 |

Primary Examiner—Paul E. Maslousky
Attorney, Agent, or Firm—Buell, Blenko, and Ziesenheim

[57] ABSTRACT

The specification discloses a motor activated by a combination of fluid pressure, such as air, and gravity. The motor comprises a rotor, the shaft of which carries a cylindrical shell divided into an even number of sectors or cells. Each cell contains an envelope or bag of elastomeric material which communicates through a transverse passage in the shaft with the bag of a diametrically opposite cell. Each connected pair of bags contains a supply of high density liquid, such as Mercury, sufficient to fill one bag. A rotary valve carried on the shaft outboard of the shaft bearings controls admission and release of fluid pressure to and from the cells in the cylindrical shell via longitudinal passages in the shaft communicating therewith to sequentially supply fluid pressure to the cells to expel the liquid from bags in lower cells to bags in upper cells, thereby producing a torque on the rotor due to gravity acting on the Mercury in the upper cells.

6 Claims, 4 Drawing Figures

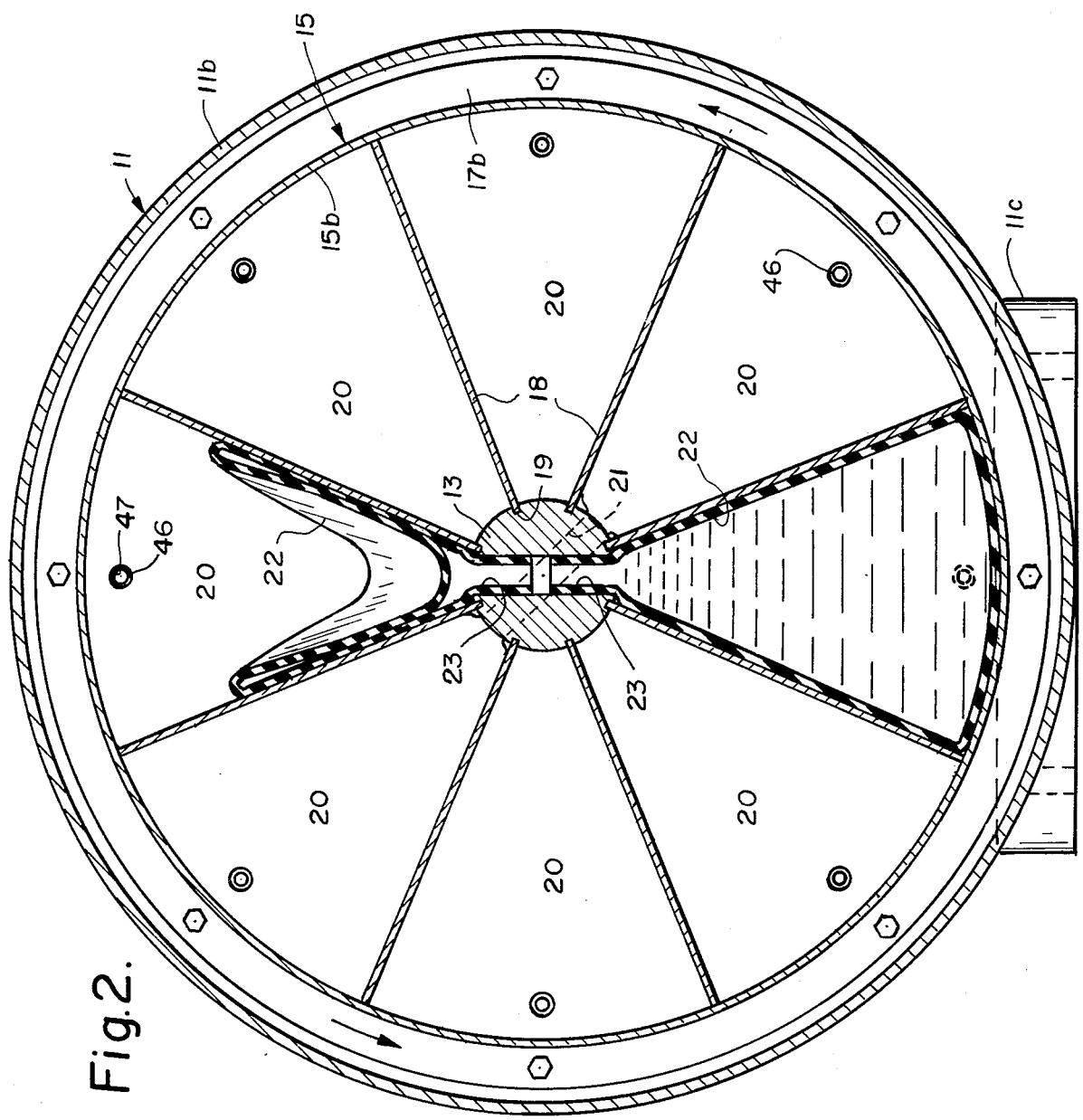

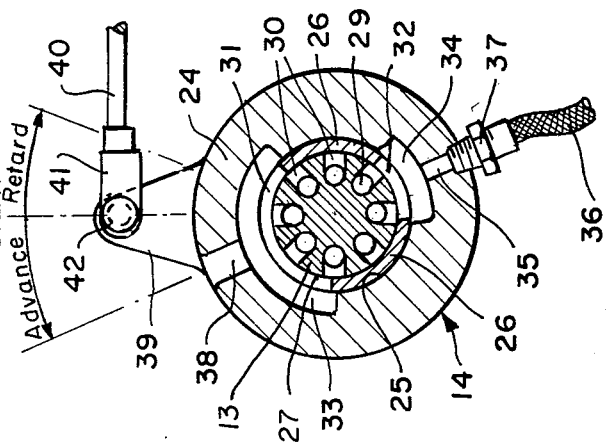
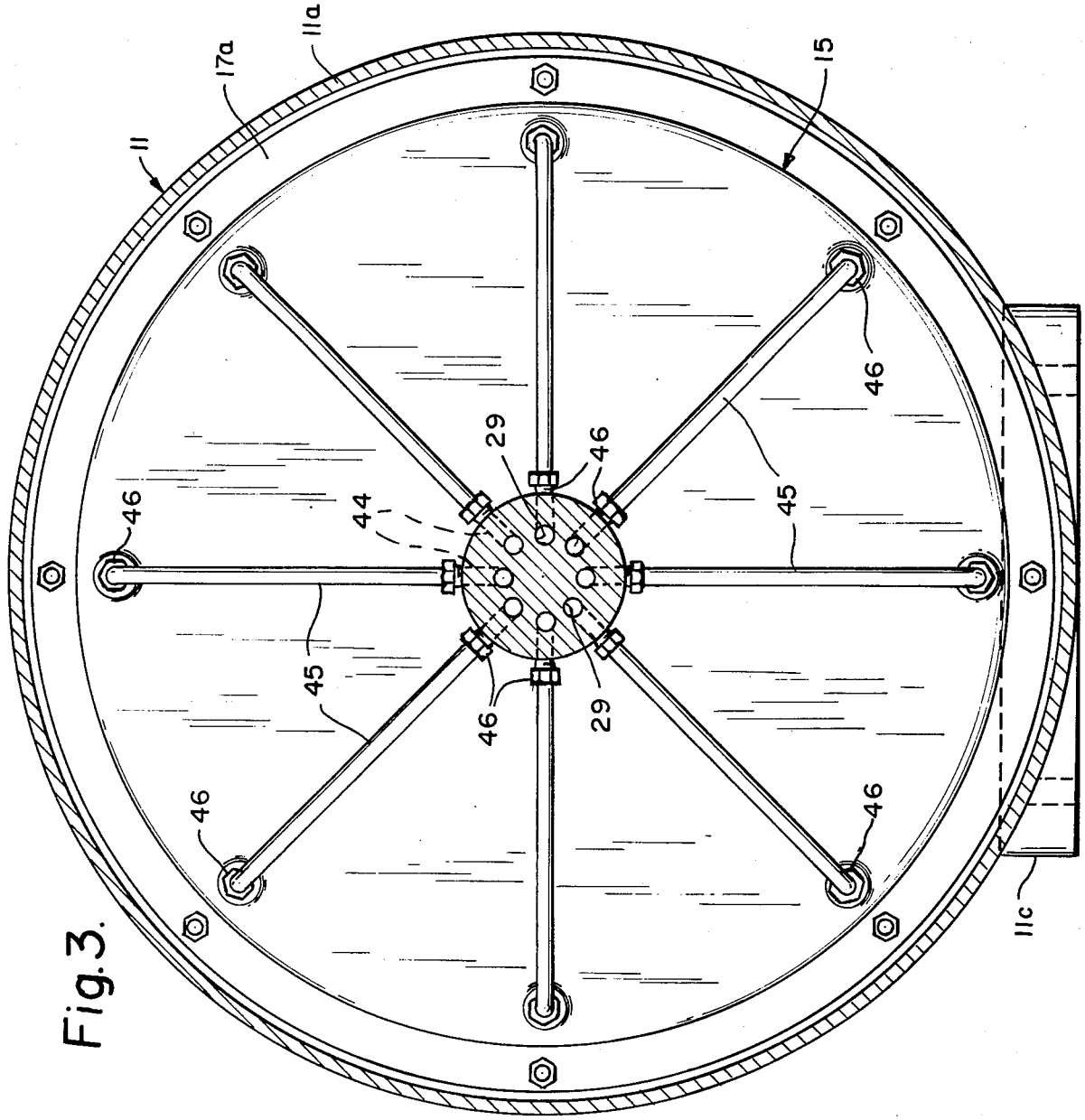

FLUID PRESSURE-GRAVITY MOTOR

This invention relates to motors of the type utilizing fluid under pressure, such as compressed air, to produce an unbalance of weight in a rotor, such that gravity is utilized to produce a rotational torque on the rotor.

I am aware of prior art patents relating generally to motors of the eccentric vane type in which a fixed part of the motor serves as a valve to control admission and exhaust of the pressurized motor fluid; I am aware also of patents, such as U.S. Pat. No. 3,019,772, issued Feb. 6, 1962, to R. P. Humphrey, in which elastic tubular cylinders circumferentially arranged around a rotor are serially pressurized to react on the rotor to produce a torque thereon.

It is an object of my invention to provide a motor having a rotor activated primarily by pressurized fluid, such as compressed air, but secondarily by the action of gravity induced by progressively unbalancing different sectors of the rotor.

More specifically, I provide a motor having a rotor with a series of circumferential cells or sectors, arranged in diametrically opposite pairs, and containing bags or envelopes of elastomeric material which communicate with each other via diametrical passages through the shaft of the rotor, each connected pair of bags containing a quantity of high density liquid, such as Mercury, sufficient to completely fill one bag, which is forced from the lower bag of a connected pair, to the upper one by pressurized fluid supplied to the cell having the filled bag, to progressively unbalance the rotor by the weight of the liquid supplied to the upper bag, thereby to cause a torque to be constantly exerted to continue rotation of the rotor.

I further provide in a motor of the type described in the foregoing paragraph, a rotary valve for controlling the supply and release of fluid under pressure to and from the cells, the rotor of the motor forming a part of or being rotated by the shaft of the motor rotor, and having a stationary portion which is rotarily shiftable through an angle to either side of a central or start position to respectively advance or retard the speed of the motor.

Additional details of construction and operation will be described hereinafter in connection with the accompanying drawings wherein:

FIG. 2 is a transverse sectional view, taken on a plane represented by the line II—II of FIG. 1;

FIG. 3 is another transverse sectional view, taken on a plane represented by the line III—III of FIG. 1; and FIG. 4 is a further transverse sectional view, taken on a plane represented by the line IV—IV of FIG. 1, showing further details of the rotary speed control valve associated with the shaft of the motor.

Figure 1:
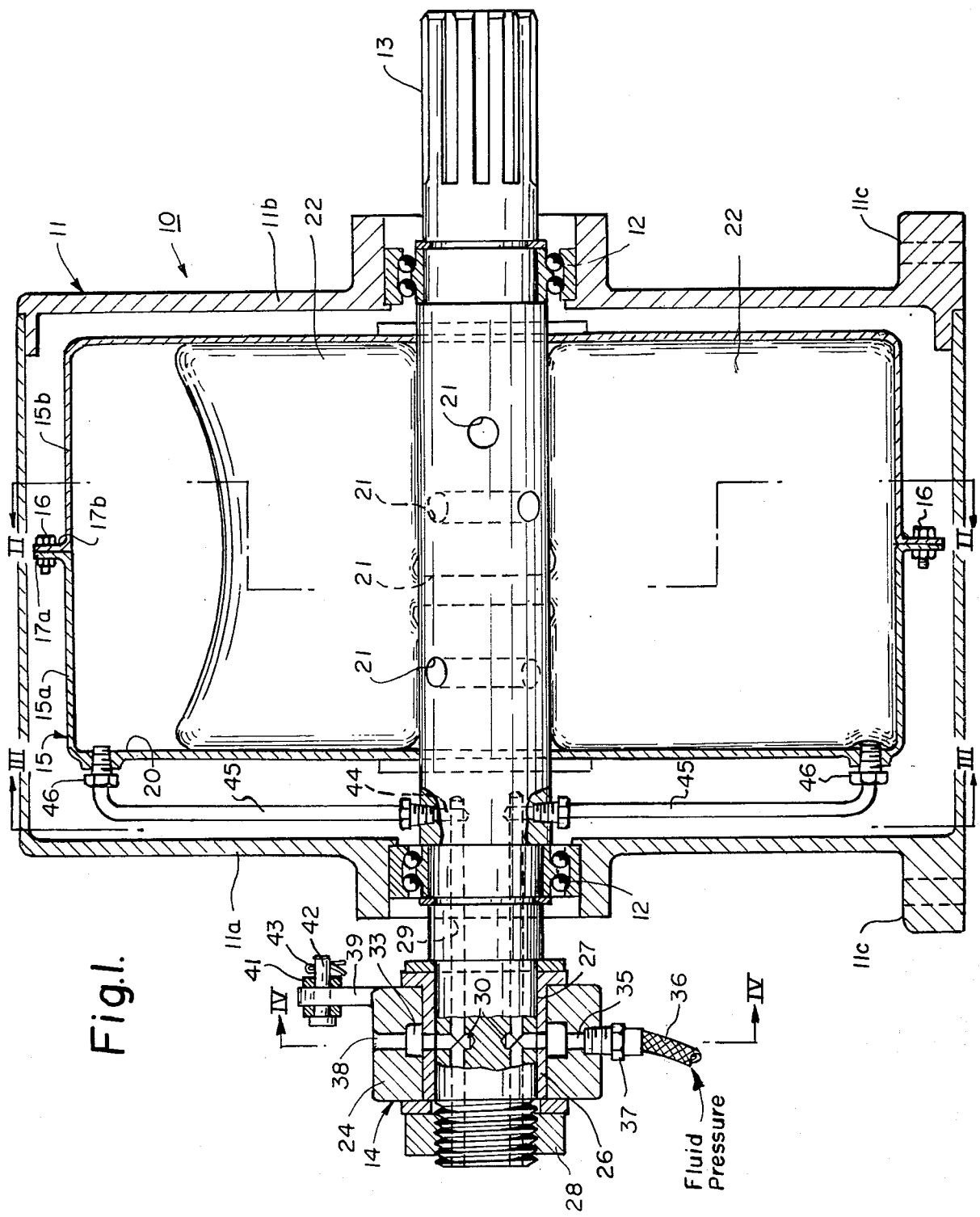
FIG. 1 is a longitudinal elevational view in section, of a preferred embodiment of a motor comprising the invention.

Referring to the drawings, the embodiment of motor 10 shown comprises an outer cylindrical stationary housing 11, preferably cast into opposite end sections 11a and 11b adapted to be joined together. The end sections are cast with stabilizing base portions 11c by which to attach or mount the motor. Rotatably mounted in central bearings 12 in the end sections 11a and 11b is a shaft 13, one end of which is splined for connection to an element to be driven and the other end of which extends through and forms the rotor part of a rotary control valve 14.

Suitably attached as by welding to the shaft 13, prior to assembly of the housing 11, is a cylindrical shell 15 formed in two severable cup-like parts 15a and 15b and adapted to be joined in sealed relation as by bolts 16 through mating circumferential flanges 17a and 17b. The shell 15 is formed with a plurality of radially extending partitions 18 attached, as by welding, along the ends and the outer edges to the inner surface of the parts 15a and 15b and sealingly nested at the inner ends thereof in longitudinally extending grooves 19 in the shaft 13. An even number of partitions 18, illustratively shown as eight, is provided, thereby providing an equivalent number of cells or chambers 20, having a cross-sectional area in the form of a sector of a circle.

Each diametrically opposite pair of cells 20 is connected by a diametric bore or passage 21 through shaft 13, the bores 21 for the respective pairs of cells being in axially spaced relation, as seen in FIG. 1.

Each cell 20 contains a bag or envelope 22 (FIG. 2) of elastomeric material conforming in shape to that of the walls of the cell and having a nipple 23 which fits snugly within and is preferably sealed within one end of the bore 21 connecting the corresponding cells to its diametrically opposite cell.

For clarity, only one pair of communicating bags 22 is illustrated in FIG. 2, but it should be understood that there are three additional pairs of communicating bags 22 in the remaining pairs of diametrically opposite cells.

One of each communicating pair of bags 22 is filled with a high density liquid, such as Mercury, which flows out of the bag in one cell into the bag in the opposite cell responsively to the supply of fluid under pressure, such as compressed air, to the one cell, in the manner presently described. Upon pressurization of a cell 20 with compressed air, the bag 22 therein is compressed or collapsed, thereby causing the Mercury to flow through the connecting bore 21 to the bag 22 in the diametrically opposite cell which expands to receive it.

Fluid pressure is supplied in timed sequence to the cells 20 under control of the rotary valve 14. Rotary valve 14 comprises a stator housing or casing 24 having a central bore 25 provided with a sleeve or bushing 26 which seats on a shoulder 27 formed on the left-hand end of the shaft 13 outboard of the bearing 12 in housing section 11a. The stator housing 24 is retained in a fixed axial position on the shaft 13 by a washer and a nut 28 screwed on the outer threaded end of shaft 13.

Arranged in spaced angular relation in a circle about the longitudinal axis of shaft 13 are a plurality of axially extending passages 29 corresponding in number to the number of cells 20 in the shell 15. Passages 29 are open to the surface of the shaft 13 via corresponding radial ports 30 in the shoulder 27 (FIG. 4). Bushing 26 has two circumferentially extending slots 31 and 32 which open respectively into an exhaust manifold or chamber 33 and a supply manifold 34 in the stator housing 24. Supply manifold 34 is connected to a source of fluid under pressure, such as compressed air, through a port 35 to which a flexible supply hose 36 is connected as by a screw fitting 37. The exhaust manifold 33 is open to atmosphere via an exhaust port 38.

Housing 24 of rotary valve 14 has an arm 39 extending radially therefrom to which a control rod 40 is pivotally connected as by a clevis 41 straddling the arm 39 and a pin 42 extending through registering holes in the arm and clevis and secured against dislodgement, as by a cotter pin 43.

The ends of passages 29, inboard of the bearing 12, are similarly open to the surface of the shaft via corresponding radial ports 44. Each port 44 is connected to a corresponding cell 20 in shell 15 by a section of tubing or pipe 45, provided with suitable screw type fittings 46 for connection to the ports 44 and to the ports 47 in the end wall of shell 15 opening into the cells 20.

In operation, let it first be assumed that the bags 22 of the cells 20 within the rotary shell 15 below a horizontal diameter are filled with a heavy liquid, such as Mercury, and that the bags 22 within the diametrically opposite cells are correspondingly deflated or collapsed. With the control valve 14 in the "start" position, as shown in FIG. 4, let it now be assumed that fluid under pressure, such as compressed air, is supplied to hose 36 by opening a supply valve (not shown) controlling the connection of hose 36 to a charged reservoir.

With control valve 14 in its "start" position, fluid under pressure is thus supplied to supply manifold 34, with which several of ports 30 are in communication via slot 32 in bushing 26, and hence via the corresponding axial passages 29, and pipes 45 to the corresponding cells 20. The pressurization of the cells squeezes the bags in the cells and causes flow of Mercury out of the bags through bores 21 into the bags 22 of the opposite cells above the horizontal diameter of the shell 15. Concurrently, the cells of the bags 22 to which Mercury is being transferred, are opened to atmosphere via pipes 45, passages 29, exhaust manifold 33 and exhaust port 38 of the control valve 14, thereby allowing air to escape to atmosphere as the bags 22 expand with the supply of Mercury thereto. As viewed in FIG. 2, the weight mass in the shell 15 is thus unbalanced and produces a torque force which initiates rotation of the shell 15 in a counter-clockwise direction as indicated by the arrows. As viewed in FIG. 4, the shaft 13 correspondingly rotates in a clockwise direction, indicated by the circular arrow on the shaft.

It will be seen from FIG. 4 that with clockwise rotation of the shaft 13, the ports 30 are successively moved into registry with the pressure supply manifold 34, thereby establishing communication through which pressure fluid is supplied progressively to the corresponding cells 20 of the shell 15. also, it will be seen from FIG. 4 that the port 30 for the cell 20 diametrically opposite that to which supply of pressure fluid is initiated, will have already been connected to the exhaust manifold 33 and exhaust port 38, due to the fact that the slot 31 in bushing 26 is longer than the slot 32. Thus the collapsed bag 22 in the exhausted cell 20 is free to expand with the transfer of Mercury thereto from the bag 22 in the opposite or pressurized cell 20.

The effect of the weight transfer to successive cells of shell 15 above the horizontal diameter is similar to that of a waterwheel, namely a constant application of torque force to cause rotation of shell 15.

With the control valve arm 39 remaining in its "start" position, the rotor or shell 15 will attain a certain maximum rotational speed and then stabilize on that speed.

If it is desired to increase the rotational speed of the shell 15, the arm 39 of valve 14 is shifted, as through the medium of control rod 40, in a counter-clockwise direction up to a certain maximum angle indicated in FIG. 4. This will advance the stator portion 24 of valve 14 with respect to the direction of shaft rotation, thus increasing the rapidity with which the full quantity of Mercury is transferred to the bag in a cell above the horizontal diameter, and thereby causing an increase in the speed of rotation of the shell 15.

Conversely, if it is desired to reduce the speed of the shell 15 from that at which it is stabilized in the "start" position of control valve 14, movement of the arm 39 in a clockwise direction through a "retard" zone (FIG. 4) will cause shifting of the stator 24 correspondingly to effect a delay in the transfer of Mercury to a bag in a cell above the horizontal diameter, resulting in a slowing down of the rotational speed of the shell.

While the embodiment above-described has been referred to as preferred, it will be apparent that variations and modifications therein are possible within the terms of the following claims.

I claim:

1. A fluid pressure-gravity activated motor comprising a rotor having a shaft by which the rotor is mounted for rotation about the axis of said shaft and a series of rigid chambers circumferentially arranged about said shaft, a bag of flexible elastomeric material within each of said chambers, means providing communication between the bags in each pair of chambers on diametrically opposite sides of the shaft of said rotor, and a quantity of high density liquid contained in one bag of each pair of said bags, which liquid is shifted therefrom to the other bag of the pair in a diametrically opposite chamber due to compression of the said one bag by fluid under pressure acting directly on said one bag, and rotary valve means by which fluid under pressure is supplied in timed sequence to successive rigid chambers to effect compression of the bag therein.

2. A fluid pressure-gravity activated motor comprising a cylindrical shell secured to a shaft mounted for rotation in a stationary housing, said shell having a plurality of circumferentially arranged rigid cells, a bag of elastomeric material in each of said cells communicating with the bag in a diametrically opposite cell, a given quantity of high density liquid in one of said bags being transferred to the bag in a diametrically opposite cell to effect a weight unbalance productive of a rotational torque on said shell, and rotary valve means having a rotor rotatable in synchronism with said shaft and selectively controlling the supply of fluid pressure to and its release from said cells to directly compress said bags with said fluid pressure or to relieve pressure thereon to cause flow of said liquid from the bag in one of said cells to the bag in a diametrically opposite cell.

3. A fluid pressure-gravity activated motor according to claim 2, wherein said rotary valve comprises a stator having a fluid pressure supply manifold and a fluid pressure release manifold, and a rotor comprising an extension of said shaft and having a series of circumferentially arranged ports in angular relation adapted to register selectively with said manifolds, each of said ports communicating via corresponding axial passages in said shaft with corresponding cells in said shell.

4. A fluid pressure-gravity activated motor according to claim 2, wherein said plurality of circumferentially arranged cells are formed by radially disposed angularly spaced partitions within said cylindrical shell, which partitions are in sealed contact with the said shaft, and wherein different diametrically opposite pairs of the cells communicate through corresponding different bores that extend diametrically through the shaft, said different bores being in axially spaced relation along said shaft.

5. A fluid pressure-gravity activated motor according to claim 2 wherein said circumferentially arranged cells are disposed in diametrically opposite pairs, and wherein the bag of elastomeric material in one cell is in constant communication with the bag in the diametrically opposite cell, the high density liquid contained in a pair of bags being transferred from one bag to the other bag due to compression by fluid underpressure selectively supplied to the cell containing the liquid filled bag.

6. A fluid pressure-gravity activated motor according to claim 2, wherein said circumferentially arranged cells are disposed in diametrically opposite pairs communicating via a diametrical bore through said shaft, wherein the bag of elastomeric material in each of said cells has a nipple sealed in one end of the communicating bore therebetween, and wherein the high density liquid contained by a communicating pair of bags is sufficient in quantity to fill only one bag of said communicating pair of bags.

* * * * *